March 16, 1943.   M. C. WIDGER   2,313,791
DESEEDING AND CLEANING MACHINE
Filed Sept. 11, 1940   3 Sheets-Sheet 1
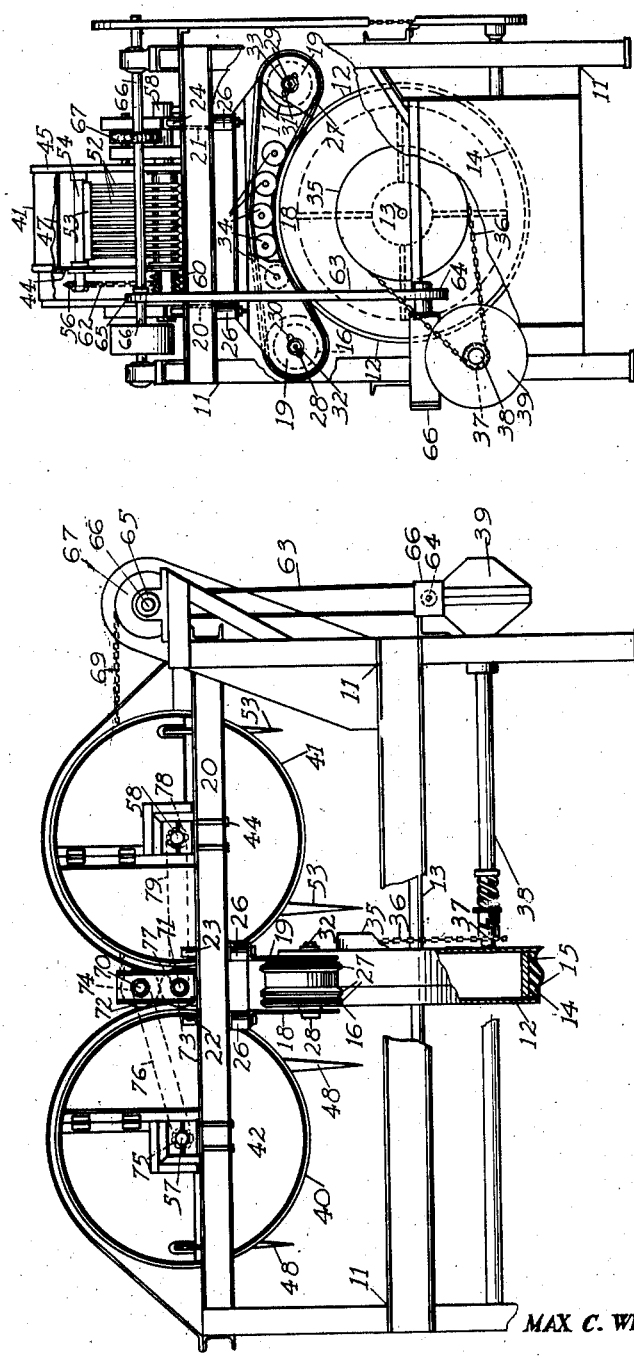
MAX C. WIDGER, INVENTOR
BY G. J. Kramer
ATTORNEY

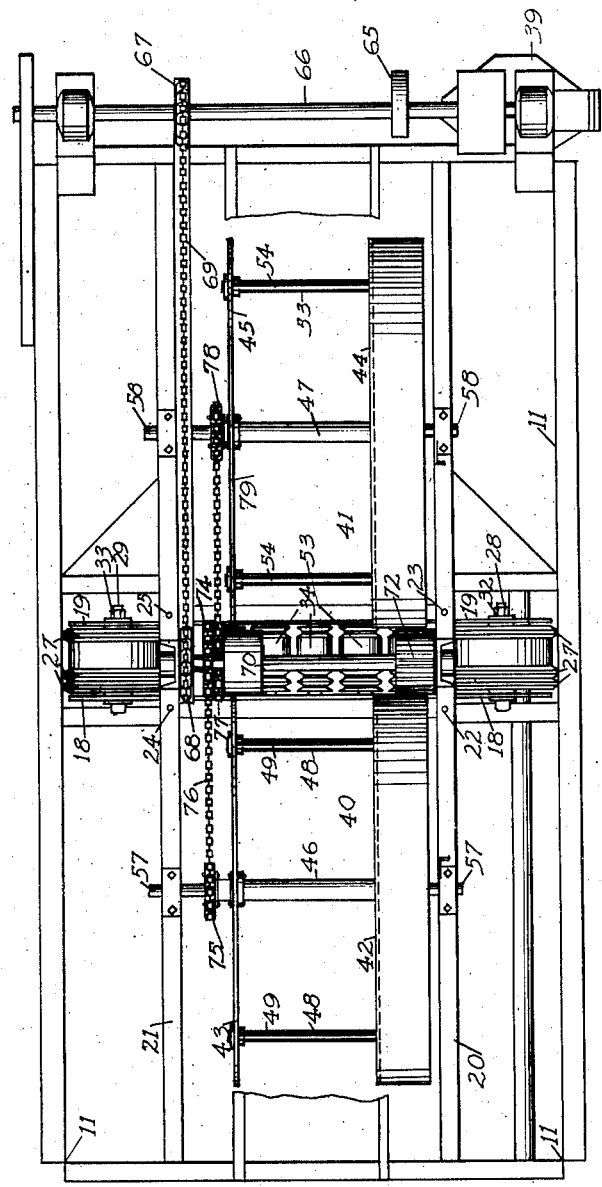

March 16, 1943.  M. C. WIDGER  2,313,791
DESEEDING AND CLEANING MACHINE
Filed Sept. 11, 1940  3 Sheets-Sheet 3

MAX C. WIDGER, INVENTOR

BY G. J. Kramer
ATTORNEY

Patented Mar. 16, 1943

2,313,791

UNITED STATES PATENT OFFICE 2,313,791

DESEEDING AND CLEANING MACHINE

Max C. Widger, Corvallis, Oreg.

Application September 11, 1940, Serial No. 356,306

1 Claim. (Cl. 130—13)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to machines for removing the seed from flax or other plants and especially to machines adapted to be used in connection or association with retting and decorticating processes, in order to remove the seed from the stock before it is placed in retting tanks or fed into a decorticating machine. In the operation of retting flax, for example, it is highly important to remove all of the seed before the straw is placed in the retting tanks, as otherwise the intrinsic value of the seed is impaired.

The present invention has for its object the provision of a deseeder, by means of which the separation of the seed from the straw is accomplished more efficiently and without injury to the seed or to the straw. Another object of this invention is the provision of means for combing or straightening out the straw in such a manner that the flax or other stock, after removal of the seeds, is in proper condition for retting or decorticating without further processing operations.

An embodiment of this invention is illustrated in the accompanying drawings in which:

Figure 1 is a side elevational view, partly in section;

Figure 2 is an end elevational view, partly in section; and

Figure 3 is a plan view with parts broken away;

Figure 5:
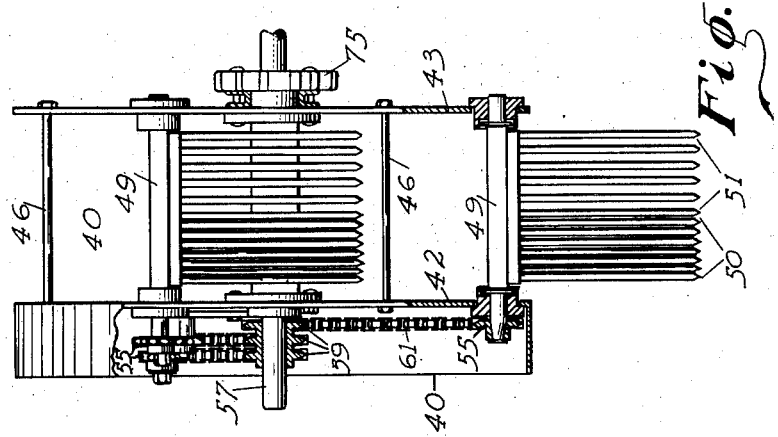
Figure 5 is a side view of Figure 4.
Figure 4:
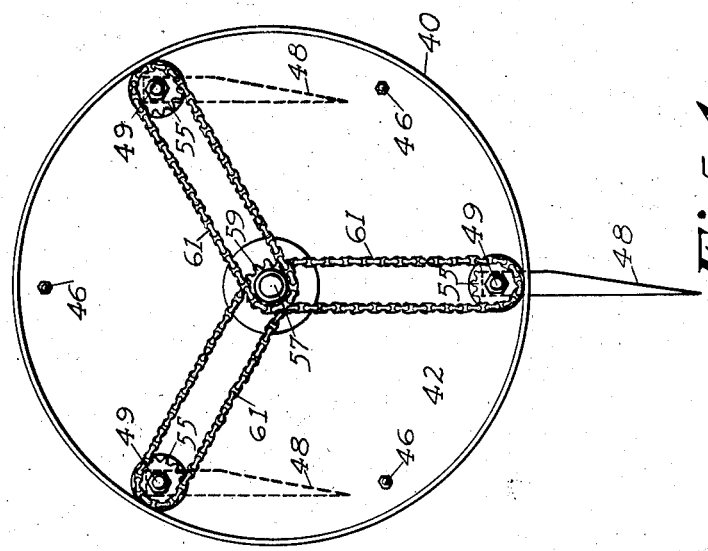
Figure 4 is an end view of one of the comb drum assemblies with a part of the casing removed to show interior arrangement.

Referring with more particularity to the drawings, in which like numerals designate like parts, the machine is carried by a suitable frame structure 11 in which is disposed a wheel 12. This wheel is rotatably mounted on a fixed longitudinal shaft 13. The wheel 12 is provided with a rim 14 of a yieldable material, such as rubber, the periphery of which contains circumferential grooves 15. On top of the wheel 12 there is disposed a belt and pulley assembly consisting of two main pulleys 16 and 17 rotatably mounted between two bearing plates 18 and 19, said plates being yieldably secured to frame members 20 and 21 by means of pins 22, 23, 24, and 25, and cushions of rubber 26, or other suitable resilient material, between the frame members 20 and 21 and the bearing plates 18 and 19. The pulleys 16 and 17 carry belts 27, preferably the V-type, substantially as illustrated. Shafts 28 and 29 which carry the pulleys 16 and 17, respectively, are preferably made adjustable by employing slotted bearings 30 and 31 for said shafts, respectively, and by providing threaded nuts 32 and 33 on the outer threaded ends of said shafts, so that they can be secured in different positions in said slots. This arrangement permits proper tensioning of the belts 27. Between said pulleys 16 and 17 additional pulleys 34 are mounted across the plates 18 and 19. These pulleys abut the belts 27 and hold them in position in the grooves 15 on an arc of the rim 14. Power is delivered to the wheel 12 by any suitable means. The means shown in the drawings consists of a sprocket 35 concentrically secured to the hub of the wheel engaging a chain 36 driven by sprocket 37 of a shaft 38 powered by motor 39. When the wheel 12 is rotated, it frictionally engages belts 27 and causes them to move about the pulleys 16, 17 and 34.

On each side of the wheel 12 there is disposed the comb drum assemblies 40 and 41. Each of these assemblies consists of a pair of spaced discs 42, 43 and 44, 45, respectively, held in position by spacing bars 46 and 47, respectively. Between the discs 42 and 43 there are mounted a plurality of combing units 48. These combing units are each fixed to a rotatable shaft 49, substantially as shown. Some of the teeth 50 of these combs are narrowly spaced and the remaining teeth 51 are relatively widely spaced, as shown in Figure 5. The teeth 52 of the combs 53 in the other comb drum assembly 41 are all widely spaced and are mounted similar to the combs in the assembly 40, by means of shafts 54 rotatably mounted between discs 44 and 45. The teeth in the assembly 41 are for the removal of dirt from the root ends of the straw and are spaced accordingly, while the teeth in the assembly 40 are for removing the seed from the straw, the widely spaced teeth 51 acting to first straighten out the straw without damage before it reaches the closely spaced teeth 50 which comb out the seed. The shafts 49, 54 extend through the discs 42, 44 and each is provided with a sprocket 55, 56, respectively. Each assembly 40, 41 is rotatably mounted on a stationary shaft 57, 58, respectively, provided with sprockets 59, 60, there being one sprocket for each of the combs of the assemblies. Each of the sprockets 59, 60 is connected to its adjacent sprocket 55, 56 by means of a suitable sprocket chain 61, 62. The sprockets 55, 56 and 59, 60 are of the same size and the combs of the assemblies 40 and 41 are normally in a vertical position. Consequently, any rotation of the assemblies 40 and 41 about the stationary shafts 57, 58 rotates the shafts 49, 54 just enough to maintain the combs in a vertical position. Rotation of these comb drum assemblies may be accomplished by any suitable means. The means illustrated are as follows: Power from the motor 39 is applied through a belt 63 and pulleys 64 and 65 to a shaft 66 which is geared by means of sprockets 67 and 68 and a chain 69 to the shaft 70 mounted between the two comb drum assemblies 40 and 41. Beneath the shaft 70, another shaft 71 is mounted parallel. These shafts 70 and 71 are geared to each other by means of meshed gears 72 and 73 secured to said shafts, respectively. Due to this gearing the shafts 70 and 71 operate in opposite directions. The shaft 70 is provided with sprocket 74 which is connected to another sprocket 75 secured to the disc 43, by means of the chain 76. Similarly, the shaft 71 is provided with a sprocket 77 which is connected to another sprocket 78 secured to the disc 44 by means of a chain 79.

In operation, the bundles of flax are arranged with the seed ends in one direction. The bands holding the bundles together are then cut and the straw spread as a mat. This mat with the straw parallel to the axis of the wheel 12 is fed into the machine so as to be caught between the wheel 12 and the belts 27. As the straw moves around with the wheel 12, it is pressed into the grooves 15 by the belts and held firmly against the cushion surface of the wheel. At the same time the comb drum assemblies 40 and 41 are revolving which causes the teeth of the comb to engage the portions of the straw protruding laterally from the wheel 12. The straw should be introduced into the machine so that the root ends of the straw are on the sides of the assembly 41, while the seed ends are on the side of the assembly 40. The combs of the assembly 41, engaging the straw, remove dirt and weeds from the root ends, while the teeth of the assembly 40 first straighten the protruding straw and then strip the seed therefrom. The straw continues to pass around with the wheel 12 at the point where the periphery of the wheel and the belts 27 separate. At this point, the straw is collected for further processing.

Having thus described my invention, I claim:

In a machine of the character described having a wheel rotatably mounted and means associated with a portion of the periphery of said wheel for gripping plant stalks, drums straddling said wheel, stationary shafts rotatably supporting said drums, a plurality of combs carried by said drums to act successively upon the ends of grain stalks held on said wheel, said combs being in parallel planes, and positive means between said shafts and said combs for maintaining said combs at a constant angle with respect to the grain stalks.

MAX C. WIDGER.